M. BOSTWICK.
MACHINE FOR CUTTING WOOD MOLDINGS.

No. 192,858. Patented July 10, 1877.

WITNESSES.
Ed. K. Nottingham
Albert H. Bright

INVENTOR
M. Bostwick
By Leggett and Leggett,
ATTORNEYS

UNITED STATES PATENT OFFICE.

MATTHEW BOSTWICK, OF PAINESVILLE, OHIO, ASSIGNOR OF ONE-HALF HIS RIGHT TO S. L. TITUS, OF SAME PLACE.

IMPROVEMENT IN MACHINES FOR CUTTING WOOD-MOLDINGS.

Specification forming part of Letters Patent No. 192,858, dated July 10, 1877; application filed July 20, 1876.

*To all whom it may concern:*

Be it known that I, MATTHEW BOSTWICK, of Painesville, in the county of Lake and State of Ohio, have invented certain new and useful Improvements in Hoop and Molding Machines; and I do hereby declare the following to be a full, clear, and exact description of the invention, such as will enable others skilled in the art to which it pertains to make and use it, reference being had to the accompanying drawings, which form part of this specification.

My invention relates to an improved machine for making mast-hoops, hoops for cooper's work, moldings, battens, weather-strips, and the like, which performs the various operations of sawing a rough log or piece of timber into boards and strips, and cutting the latter to the desired shape at one and the same time.

Figure 1:
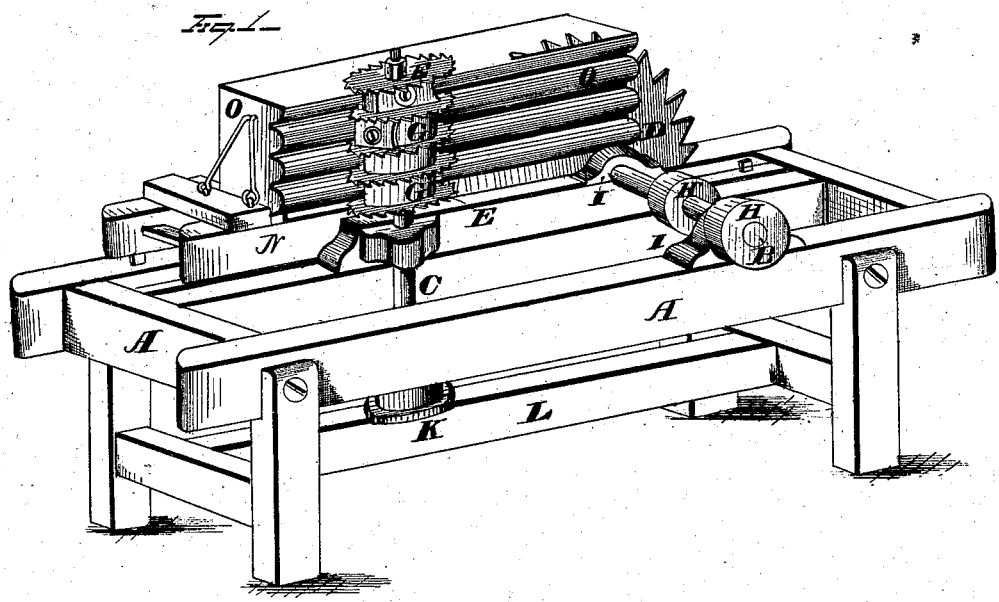
Figure 2:

In the drawings, Figure 1 represents an isometric view of a machine embodying my invention. Fig. 2 is a similar view of one of the cutters or forming-knives attached to its holder.

The invention consists of a circular saw arranged at right angles to a series of circular saws, between which latter are fixed a series of cutters or forming-knives revolving therewith, and as will be more fully hereinafter described and claimed.

B is a horizontal shaft carrying the large circular saw D and pulleys H H', and is journaled in standard I of the frame A of the machine.

C is a vertical shaft, journaled in the cross-bar L and bracket, and carrying on its head, above the said bracket, a series of circular strip-saws, E, and cutters or forming-knives G, both of which are rigidly secured to the shaft, or to handles attached thereto, in the case of the latter. The forming-knives are arranged in a spiral form around the head of the shaft. The series of circular saws and forming-knives can be detached from the head of the shaft and saws of larger or smaller diameter with knives of greater or less width, can be substituted therefor, so as to cut articles of greater or less width or thickness, or both, as may be desired. By substituting knives of different forms the shape of the article is altered, and thus moldings and the like can be produced of any required outline. By removing the forming-knives and substituting in place thereof plain rings of the same width as the article to be produced, stuff for rake, hoe, fork, and other handles can be sawed directly from the log or timber. The large saw D, which cuts the log into boards, is movable, so as to cut them of any required thickness.

N is the carriage on which a log or piece of timber, O, is secured, and which is fed forward by ordinary feed-gear.

K is a pulley on vertical shaft, which receives motion in any usual manner.

The device of a series of circular saws with a series of forming-knives, as herein described, may be attached to any ordinary saw-mill, whether provided with straight or circular saw, and thus constitute my machine.

What I claim as my invention, and desire to secure by Letters Patent, is—

In a machine for making hoops, the combination, with the horizontal driving-shaft B, and circular saw D secured thereto, of the vertical driving-shaft C, provided with a series of stripping-saws, E, and cutters or forming-knives G, said cutters consisting of flat knives detachably secured to collars placed between the saws, the cutters being arranged spirally about the shaft, substantially as described.

In testimony whereof I have signed my name to this specification, in the presence of two subscribing witnesses.

MATTHEW BOSTWICK.

Witnesses:
H. A. HOUGH,
DAN S. ROBERTSON.